March 4, 1930.  E. A. TURNER  1,749,049
WINDSHIELD CLEANER
Filed April 18, 1928
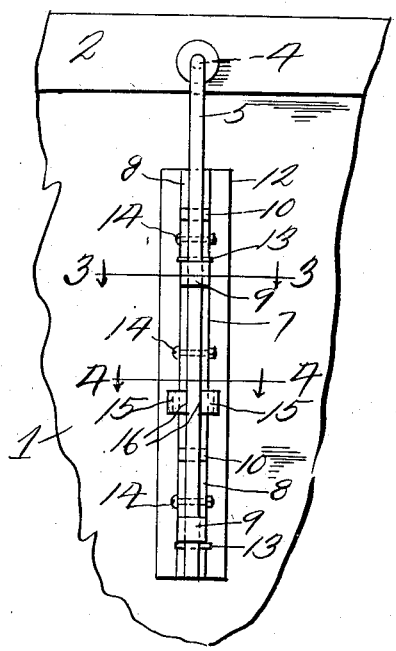
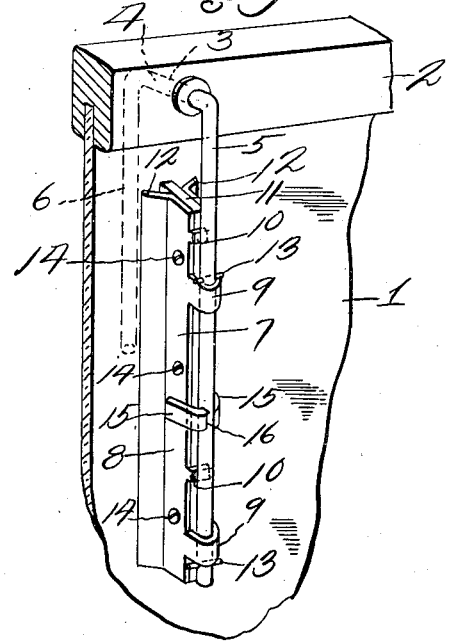
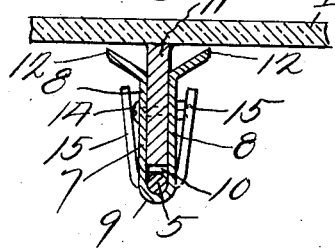
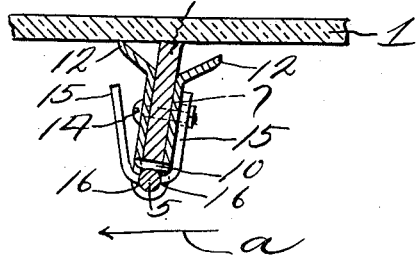
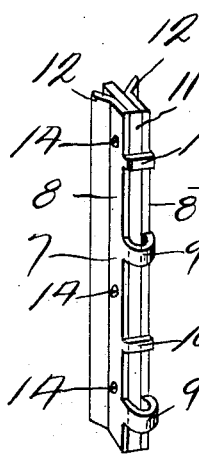
Inventor
E. A. Turner
By Philip A. H. Sewell
Attorney Patented Mar. 4, 1930

1,749,049

UNITED STATES PATENT OFFICE

ELDON A. TURNER, OF GRANITEVILLE, MASSACHUSETTS

WINDSHIELD CLEANER

Application filed April 12, 1928. Serial No. 270,925.

The invention relates to windshield cleaners, particularly of the oscillating arm type and has for its object to provide a device of this character wherein a frame is rockably mounted on the arm and provided with a glass engaging strip formed from rubber or other material of a yieldable nature and the frame with glass scraping flanges at opposite sides of the rubber, and positioned whereby upon rocking of the frame during a glass wiping operation, one of the scrapers will engage the glass, and the other one will be out of engagement with the glass, said rocking operation insuring a positive engagement of the rubber with the glass as well as the scraping edge.

A further object is to provie the oscillating arm with extension arms at opposite sides thereof and at opposite sides of the frame and positioned whereby they will be alternately engaged by opposite sides of the frame, during the oscillation of the device for limiting the pivotal movement of the frame.

A further object is to form the frame from oppositely disposed plates having diverging scraper flanges, the rear edges of which plates are provided with integral loops forming bearings for the oscillating arms, and one of said plates with integral lugs, overlying the rear edge of the other plate and forming a bearing for the rod. The plate, lugs and bearing are stamped from a single sheet of material.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the wiper, showing the same applied to a conventional form of windshield.

Figure 2 is a front elevation of the wiper.

Figure 3 is a horizontal sectional view taken on line 3—3 of Figure 2.

Figure 4 is a horizontal sectional view taken on line 4—4 of Figure 2, but showing the device rocked.

Figure 5 is a perspective view of the rockable frame.

Referring to the drawing, the numeral 1 designates the glass of a conventional form of automobile windshield, and 2 the top rail thereof. Rotatably mounted in a bearing 3 of the top rail is the horizontal portion 4 of the windshield wiper arm 5, which arm extends downwardly in front of the glass 1.

The rear end of the shaft 4 is provided with a handle member 6, adapted to be grasped by the operator for oscillating the downwardly extending shaft 5 in parallel relation to the windshield glass 1. Although a handle member 6 is shown, it is obvious any kind of a handle member may be used, or the device may be power operated, therefore applicant does not limit himself in this regard.

Rockably mounted on the shaft 5 is a frame 7, which frame is formed from registering plates 8, the rear edges of which are connected together by arcuately shaped loops 9 adapted to form a bearing for the shaft 5. They are also provided with integral lugs 10 overlying the rear side of the rubber strips 11 and the other plate 8, and also forming a bearing for the shaft 5, and maintaining the shaft 5 out of engagement with the rear side of the rubber strip 11, which strip would easily wear. The other edges of the registering plates 8 terminate in diverging scraper flanges 12, which flanges, during the rocking of the frame 7, are alternately moved into and out of engagement with the windshield glass 1 at the points of changing the direction of oscillation of the arm, therefore it will be seen by referring to Figure 4, where the direction of movement is in the direction of the arrow a, the scraper flanges 12 will scrape the ice, snow and sleet from the glass forwardly of the wiper, and as the wiper passes over the scraped surface, water will be wiped therefrom. By providing the lugs 10 and arcuate integral members 9, it is obvious the entire frame 7 may be stamped from a single piece of material, thereby materially reducing the cost of production, and obviating machining of any of the parts. The frame 7 is held against longitudinal movement by the transversely disposed pin 13 above and below the bearing members 9.

The upper strip 11 is held between the plates 8 by the transversely disposed bolts 14, which may be easily removed when it is necessary to renew the strip 11, or when assembling the device the bolts may be easily passed through the parts. Rubber strip 11 is wider than the width of the plates 8 and scraping flanges 12. It extends beyond the scraping edges 12 into close engagement with the windshield glass 1 as clearly shown in Figure 3, whereby upon a changing of direction of oscillation of the shaft 5, the frame as a whole will rock for rocking either scraping flange into engagement with the glass. The opposite sides of the shaft 5 are provided with arms 15 which diverge towards the glass 1, and are positioned where they will engage opposite sides of the frame 7 during the oscillation thereof, and limit the movement of the frame whereby the rubber strip 11 will not come out of engagement with the glass 1. Arms 15 may be made integral with the shaft 5 or brazed thereon if desired at 16, as they can be easily assembled when the frame is in a flat position before it is bent to form, and applicant does not limit himself in this respect.

From the above it will be seen that a windshield wiper is provided which has a wiping member carried by an oscillating frame and scraping flanges on opposite sides of the wiping member, which scraping flanges are alternately brought into scraping engagement with the windshield glass as the direction of oscillation changes, and the device will accommodate itself to wear on the wiping strip as only one scraping element is in engagement with the glass at one time, and that element in advance of the wiping strip in relation to direction of movement of the wiping strip.

The invention having been set forth what is claimed as new and useful is:—

1. The combination with a windshield wiper arm movable in parallel relation to a windshield glass, of a frame rockably mounted on said arm, said frame comprising spaced registering strips, a wiper strip between the registering strip, securing means passing through the registering strip and the wiper strip, the rear edges of said registering strips being connected together by arcuate integral bearing members arching the wiper arm, one of the registering strips being provided with integral lugs extending under the wiper arm and forming a bearing for one side of said arm.

2. The combination with a movable windshield wiper arm movable in parallel relation to a windshield glass, of a rockable frame mounted on said arm, a wiper strip carried by the frame and engaging the glass, said frame comprising registering plates engaging opposite sides of the wiper strip and secured thereto, the rear edges of said wiper strips being provided with integral bearing members arching one side of the arm, integral members carried by one of said plates and engaging the under side of the arm, and means carried by the arm and cooperating with opposite sides of the frame for limiting the rocking movement thereof.

In testimony whereof I hereunto affix my signature.

ELDON A. TURNER.